United States Patent
Bauer et al.

[11] Patent Number: 6,026,151
[45] Date of Patent: Feb. 15, 2000

[54] NETWORK BASED DETERMINATION OF COST EFFECTIVE ACCESS

[75] Inventors: Thomas Michael Bauer, Belle Mead; Christopher P. Gilboy, Freehold, both of N.J.

[73] Assignee: AT&T Corp., Middletown, N.J.

[21] Appl. No.: 08/874,120

[22] Filed: Jun. 12, 1997

[51] Int. Cl.[7] .......................... H04M 15/00; H04M 3/42; H04M 7/00

[52] U.S. Cl. .................. 379/115; 379/112; 379/207; 379/210; 379/221

[58] Field of Search ............................... 379/112, 113, 379/114, 115, 127, 121, 201, 207, 210, 211, 219, 220, 221

[56] References Cited

U.S. PATENT DOCUMENTS

| | | | |
|---|---|---|---|
| 4,757,267 | 7/1988 | Riskin | 379/113 |
| 5,689,555 | 11/1997 | Sonnenberg | 379/211 |

*Primary Examiner*—Paul Loomis

[57] ABSTRACT

A system and method to access an information or electronic service uses a single access telephone number. The telephone number is used to access a particular service provider no matter where the subscriber is located, and may be, for example, 950-DATA, 1-800-ATT-DATA, or 1-500-EASY-DATA. The system and method are particularly well suited to internet access through internet service providers (ISPs).

17 Claims, 6 Drawing Sheets

FIG. 3
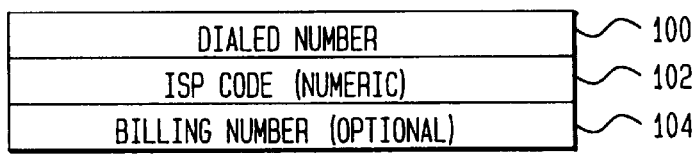
FIG. 4
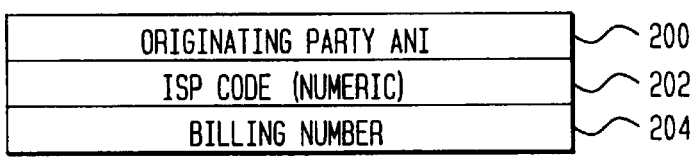
FIG. 5
| ISP CODE | LOCATION NPA-NXX | BILLING CODE SENT? | ROUTING NUMBER | ALTERNATE ROUTING NUMBER (S) |
|---|---|---|---|---|
| 0001 | 908 123 | N | 908 666-0000 | 908 666-7000 |
| 0001 | 908 123 | Y | 908 666-0001 | 908 666-7001 |
| 0001 | 303 975 | N | 303 966-4444 | 303 967-7777 |
| 0001 | 303 975 | Y | 303 966-5555 | 303 967-7755 |
| 0001 | 201 823 | * | 201 822-7654 | 201 822-7655 |
| ⋮ | ⋮ | ⋮ | ⋮ | ⋮ |
| 0002 | 908 123 | N | 908 345-9000 | 908 345-9870 |
| 0002 | 908 123 | Y | 908 123-9001 | 908 129-9000 |
| 0002 | 303 975 | * | 303 966-8423 | 303 946-5413 |
| 0002 | 201 823 | N | 201 821-7754 | 201 822-7887 |
| 0002 | 201 823 | Y | 201 827-7655 | 201 822-7888 |
| ⋮ | ⋮ | ⋮ | ⋮ | ⋮ |
| 5000 | 712 455 | * | 712 433-4806 | 712 439-0000 |

FIG. 6
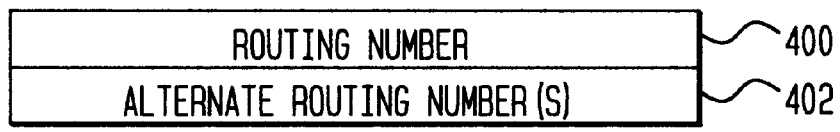
FIG. 7
FIG. 10
| BILLING NUMBER | ISP CODE |
|---|---|
| 908 123-4567 | |
| 908 234-5678 | |
| 908 345-6789 | |
| ⋮ | |
| 908 456-7890 | |
| 2240 1234 5678 1234 | |
| 516 456-7890 | |
| 410 123-4567 | |
| 802 658-4295 | |

NETWORK BASED DETERMINATION OF COST EFFECTIVE ACCESS

FIELD OF THE INVENTION

The present invention relates to access to a network or a service provider. Specifically, the invention relates to a system and method for determining the lowest cost connection for a subscriber to make to access the internet, for example, given the subscriber's physical location and that of an internet service provider.

BACKGROUND OF THE INVENTION

Today, access to the internet is typically provided by internet service providers (ISPs). Each ISP maintains a plurality of telephone numbers located across a region such that subscribers within the region will be able to access the ISP through a local telephone call without incurring any long distance telephone charges. ISPs may also maintain local telephone numbers outside of their main region of service in major cities or in other locations to which subscribers of the ISP are likely to travel. One or more toll-free telephone numbers are also maintained by ISPs for access where local service is not available. ISPs, however, typically charge a per minute fee for toll-free telephone access that may be expensive.

For a new subscriber, the ISP opens an account and suggests a local telephone number based on the subscriber's home or office address, which is used to access the internet. Typically, the subscriber configures a computer for internet access and as part of the configuration process enters the local telephone number suggested by the ISP. When logging onto the internet through the ISP, the subscriber's computer uses the local telephone number to connect to the internet, and thus the subscriber incurs either no local telephone charges or local toll telephone charges only.

By contrast, when the subscriber uses a portable computer, for example a laptop computer, and travels sufficiently far from the local telephone exchange associated with the telephone number of the ISP for which the mobile computer is configured, the subscriber's local access telephone number may not work. Then, the subscriber has three options: 1) configure the portable computer with an area code prepended to the local access telephone number; 2) configure the portable with a toll-free telephone number provided by the ISP; or 3) call the ISP to determine whether or not there is a local access telephone number that the subscriber may use given the subscriber's present location.

The first option is expensive because the subscriber will incur either local toll or long distance telephone charges during the period of internet usage. The second option is also expensive because the ISP charges a per minute connect fee for toll-free internet usage. The third option is time consuming because the subscriber must contact the ISP, which may involve a long distance telephone call, and spend the time required to access and talk to a representative to determine whether a local telephone number exists for internet access from that provider. Thereafter, the subscriber must reconfigure the computer with the desired telephone number, and then log on to the internet.

Thus, there is a need for an easier way for a subscriber to access the internet through an ISP when the subscriber has traveled away from the local exchange serviced by the ISP.

SUMMARY OF THE INVENTION

According to the present invention, to access a network such as the internet, a subscriber calls a single access telephone number to access the subscriber's particular service provider, regardless of where the subscriber is located. This access telephone number may be, for example, 950-DATA, 1-800-ATT-DATA, or 1-500-EASY-DATA.

The telecommunication network receiving the call then routes the call requesting access based on the location of the caller. The network includes at least one switching system, coupled via a network interface (i.e. a phone line) to the subscriber. One of the switching systems launches a query to a database in response to the call. The query includes a service provider code and a number identifying the network interface through which the call was received. The database includes at least one routing number corresponding to each of a plurality of service providers in the database. In response to the query, the database determines the lowest cost access to a service provider corresponding to the service provider code. Subsequently, the server returns a routing number to the switching system which routes the call based on the routing number.

A method for routing a call requesting network access according to the present invention includes a step of receiving a query from a caller via a telecommunication network. The query includes a service provider code and a number associated with a network interface on which the call originated. Subsequently, a database is accessed that has at least a routing number corresponding to each service provider in the database. Then, a routing number is determined for a service provider corresponding to the service provider code in the query. Once determined, the routing number is returned to the telephone network which routes the call based on the routing number.

BRIEF DESCRIPTION OF THE DRAWINGS

These and other object, features, and advantages will be more fully appreciated with reference to the accompanying drawings and detailed description.

FIG. 3 depicts the information elements conveyed from a subscriber to a switching system.

FIG. 4 depicts the information conveyed from a switching system to a Network Control Point.

FIG. 5 depicts the internet service provider (ISP) information stored at the Network Control Point.

FIG. 6 depicts the information that the Network Control Point sends back to the switching system in response to a query FIG. 7 shows the information the switching system sends to the ISP.

FIG. 10 depicts a database that includes a plurality of billing number and corresponding service provider codes.

DETAILED DESCRIPTION OF THE INVENTION

Figure 1:
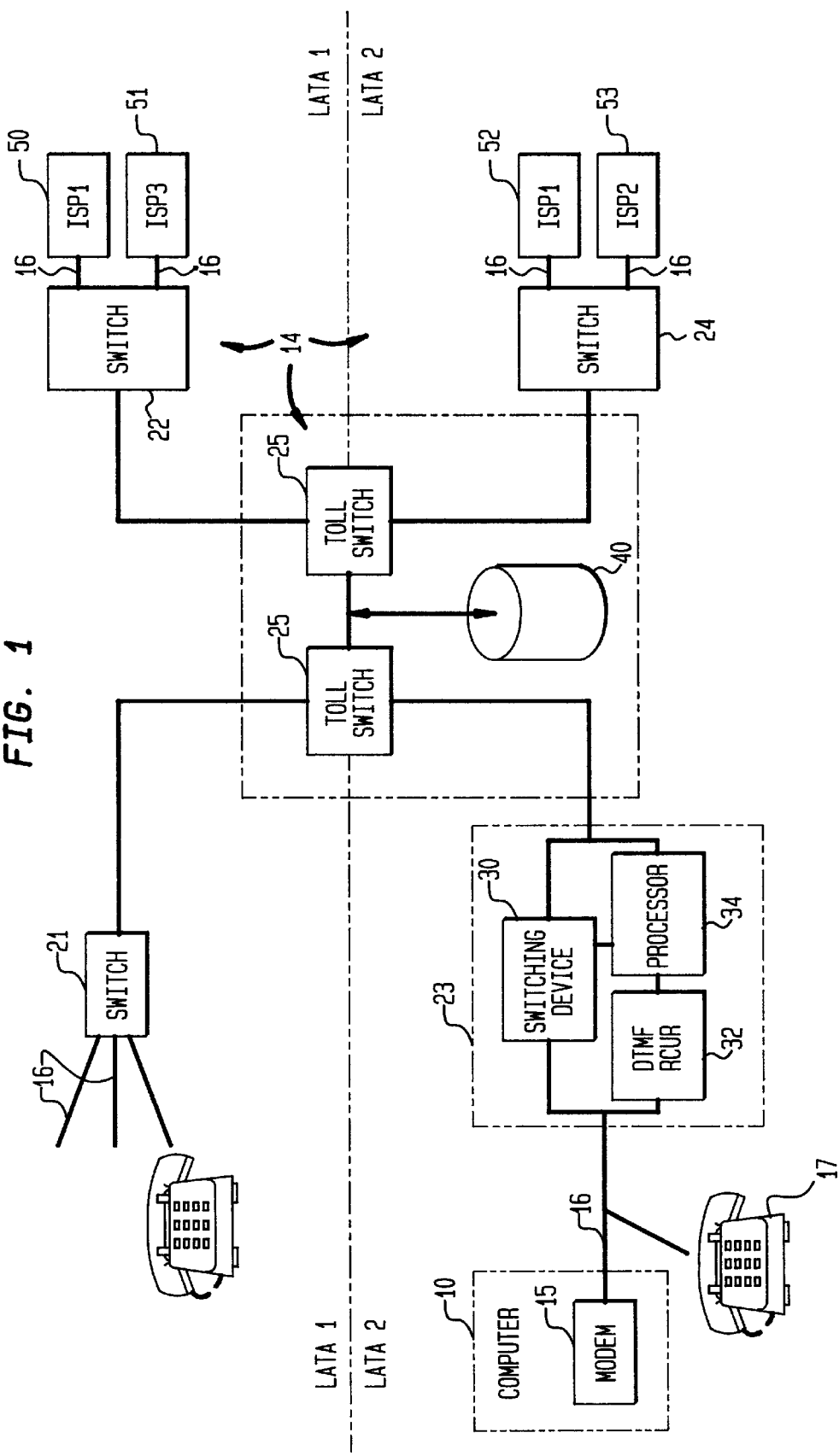
FIG. 1 depicts a telecommunications network coupled to four end office switching systems geographically dispersed from each other, with a computer, a modem, and service providers coupled to the switching systems at network interfaces.

FIG. 1 illustrates a telecommunications network that incorporates the present invention. A plurality of switching systems 21–24 are coupled to and included within a telecommunications network 14. The switching system 21–24 may be Local Exchange Carrier (LEC) end offices or access tandem switches such as the 5ESS® switching system formerly manufactured by AT&T. The switching system 21–24 are dispersed over a geographic region and provide voice and data telephone service to subscribers connected through telephone lines 16 to each switching system. One or more switching systems may define a local access and transport area (LATA) within which local exchange carriers allow subscribers to call each other without incurring long distance telephone charges. For example, referring to FIG. 1, switching system 21 and 22 are in LATA 1 and switching system 23 and 24 are in LATA 2.

The telecommunications network 14 typically includes an inter-exchange carrier network, such as the type maintained by AT&T. To that end, the network 14 includes one or more toll switching systems 25, such as the 4ESS toll switching system formerly manufactured by AT&T. Each toll switching system is associated with one or more local switching systems, for example switching systems 21–24 illustrated in FIG 1. Upon receipt of a call for a distant local switching system, the toll switching system receiving the call routes the call to the toll switching system serving the recipient local switching system. While FIG. 1 depicts a pair of toll switching systems 25, it will be understood by those having ordinary skill in the art that the network 14 could include a plurality of toll switching systems. The network 14 may also include LEC end offices and access tandem switching systems that are interconnected to provide nation-wide and international telephone service.

Internet service providers (ISPs) 50–53 are coupled via network interfaces, for example telephone lines 16, to the switching systems 22 and 24 as shown in FIG. 1. The term ISP, as used hereinafter, encompasses service providers who provide access to the internet, as well as service providers who offer other information or electronic services over a telecommunications network, including those service providers who do not offer internet access. ISPs 50–53 are strategically coupled to switching systems through telephone lines 16 in each LATA within a desired geographical region of coverage. Thus, each ISP 50–53 is accessible with a local telephone call in the region defined by the LATAs within which the ISP maintains a connection. For example, referring to FIG. 1, ISP 50 and 52 are maintained by a provider "ISP1". Thus, provider ISP1 is accessible with a local call originating in LATA 1 or 2. By contrast, provider "ISP2" maintains only ISP 53 at switching system 24 in LATA 2, and is thus not accessible with a local telephone call originating within LATA 1.

Telephone 17 and computer 10 are shown in FIG. 1 coupled to switching system 23 through a telephone line 16 within LATA 2. The switching system 23 includes a switching fabric 30, a dual tone multi-frequency (DTMF) detector 32 and a processor 34. The switching fabric 30 is coupled to the telephone lines 16 and to the network 14. The processor 34 is coupled to the switching fabric 30 and the DTMF detector 32.

Assuming that computer 10 is configured for local access to ISP 52 as shown in FIG. 1, to log on to the internet the subscriber issues an appropriate command to the computer 10. The computer 10 causes modem 15 to generate DTMF tones to dial the local telephone number of the ISP 52. DTMF detector 32 of switching system 23 receives the call. The processor 34 in that switching system recognizes the call as one directed to ISP 52 and causes the switching fabric 30 to route the call to the telephone network 14 for routing to the switching system 24 for delivery to the ISP 52. The modem 15 then begins to exchange data with the ISP 52. This scenario changes as described below when the computer 10 no longer resides in LATA 2.

Figure 2:
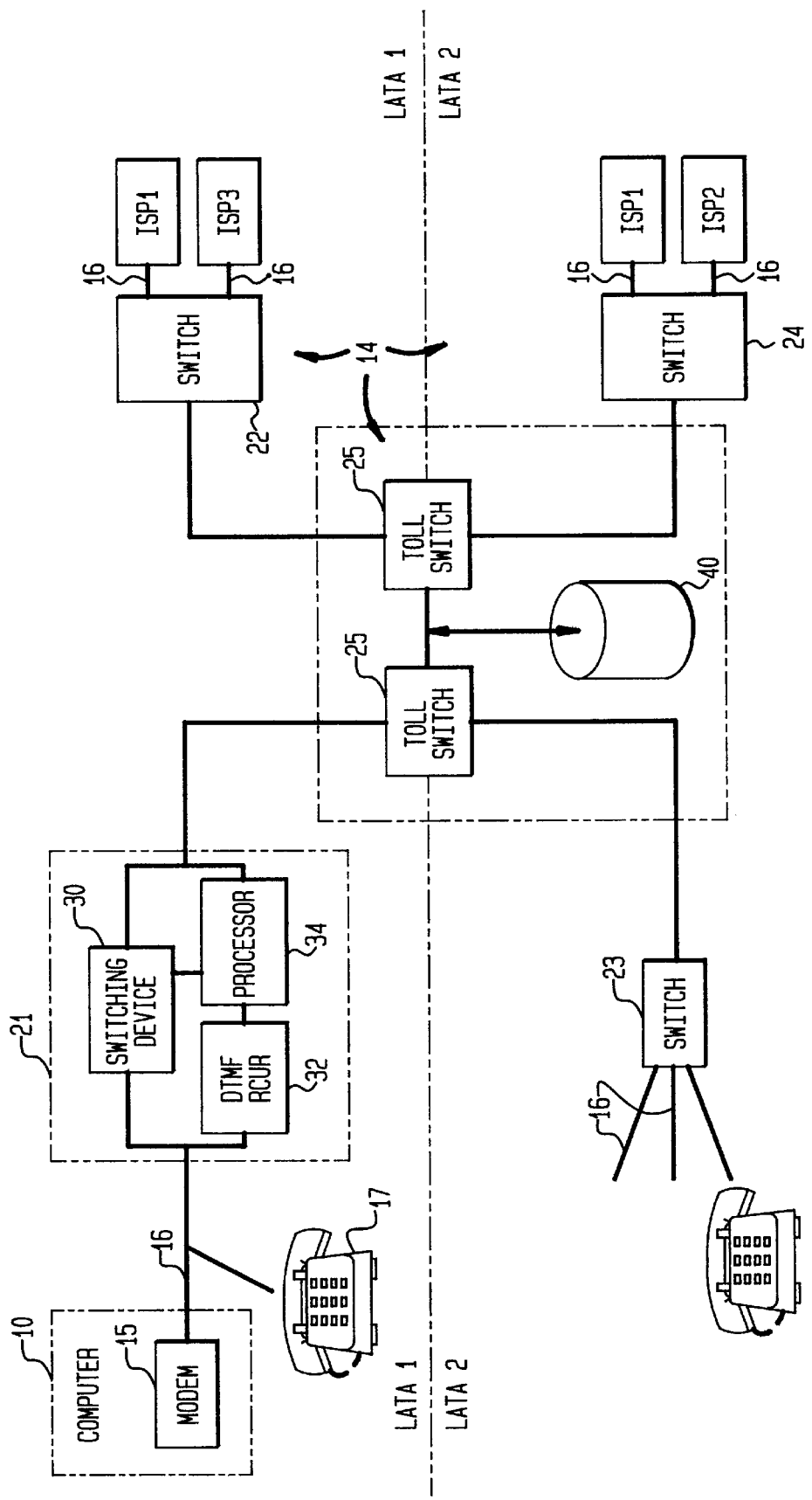
FIG. 2 depicts the network of FIG. 1, in which the computer is coupled to a switching system in local access and transport area (LATA) 1.

FIG. 2 depict the telecommunications network of FIG. 1, sees the computer 10 is coupled to switching system 21 of LATA 1 through telephone line 16. This may occur, for example, when the owner of the computer 10 goes on vacation. Although now in LATA 1, the computer 10 is still configured for local access to ISP 52 in LATA 2. If the subscriber attempts to access the internet with this configuration, the computer 10 will attempt to make connection to ISP 52 in LATA 2. When the modem 15 of the computer 10 attempts to call the ISP 52 at switching system 24, processor 34 of switching system 21 may not recognize the call and will therefore fail to route the call. Without the present invention, the subscriber must then determine how to access provider "ISP1" from LATA 1.

According to the present invention, a widely-known access telephone number is available to a subscriber for use outside of LATA 2 when the subscriber is unsure of how to access a particular ISP. The subscriber configures his computer 10 with this access telephone number and issues a command to the computer 10 to dial this telephone number. Then, modem 15 performs DTMF tone generation to dial the number. Referring to FIG. 2, the switching system 21 receives the call at its switching fabric 30 whereupon the DTMF detector 32 recognizes that the call was dialed to the prespecified access telephone number, and forwards the call to the processor 34.

Processor 34 then determines which ISP the subscriber at computer 10 requires. In one embodiment of the invention, this may be accomplished by having processor 34 play a menu of available ISPs to the computer 10 and then issuing a request to respond to the computer 10 using DTMF signaling. The subscriber then responds by issuing a command to computer 10 which is transmitted as a DTMF response through the telephone line 16 to the switching system 21. This serves to identify the subscriber's ISP to the processor 34 of the switching system 21.

The processor 34 may also identify the calling party (the subscriber) via automatic number identification (ANI) based on the number of the telephone line 16 through which the computer 10 is coupled to the switching system 21.

After identifying the subscriber's ISP and the calling number of the subscriber's telephone line, the processor 34 of the switching system then launches a query to a Network Control Point 40 using standard Signaling System 7 (SS7) protocol signaling over the telephone network 14. The Network Control Point 40 is coupled to the telephone network 14 and can be implemented in various ways such as network database or a server including one or more data bases such as AT&T's Network Control Point (NCP) or an Advanced Intelligent Network (AIN) Service Control Point (SCP). The Network Control Point 40 includes an ISP database, as described below, which has records on a plurality on a plurality IPSs. Give the desired ISP and the calling party's ANI, the network internet control point 40 accesses the database and determines the lowest cost routing number to use to access the desired ISP and returns this information to the processor 34 of the switching system 21 over the telephone network 14. Based on the routing number, the processor 34 instructs the switching fabric 30 where to route the call, and switching fabric 30 automatically connects the computer 10 to the desired ISP.

In an alternate embodiment of the invention, the query from the switching system 21 is launched without having identified the subscriber's ISP. Based on the subscriber's telephone line number, the Network Control Point 40 returns a list of available ISPs to the switching system 21. The switching system 21 then plays the list of ISPs through DTMF signaling to the computer 10. In response to receiving the list, the subscriber selects, for example, provider "ISP1".

In still another embodiment of the invention, a preliminary query is launched from switch 21 to determine the subscriber's ISP. The preliminary query includes the subscriber's billing number, which may represent any credit or debit device that identifies the subscriber including, for example, a credit card number, a calling card number, or the subscriber's own telephone number. The query is directed to a database 600 as shown in FIG. 10. The database 600, which may be included within or separate from the Network Control Point 40, includes a plurality of billing numbers 602 each with one or more corresponding ISP codes 604. In response to the preliminary query, the database 600 determines which ISP code or codes 604 correspond to the billing number contained in the query and returns the ISP code or codes 604 to the switch 21. The switch 21 then launches a query to the Network Control Point 40 that includes the ISP code or codes 604 as described below in more detail. When the Network Control Point 40 includes the database 600, the preliminary query to the Network Control Point 40 may result in both the identification of the subscriber's ISP and a routing number for the ISP.

Referring to FIG. 2, once the subscriber's ISP is known, the switching system 21 then launches a query to the Network Control Point 40. Assuming that the subscriber's ISP is "ISP1", the query includes an ISP code corresponding to provider "ISP1." In response to the query, the Network Control Point 40 accesses its ISP database and determines that provider ISP1 coupled to switching system 22 at ISP 50 in LATA 1 is the lowest cost connection for a subscriber connected to the telephone network 14 at switching system 21. Subsequently, the Network Control Point 40 returns the routine number for the ISP 50 coupled to switching system 22 to the system 21. The processor 34 of switching system 21 then directs the switching fabric 30 of switching system 21 to send the call to ISP 50 at switching system 22 over the telephone network 14. Once routed, the subscriber's computer 10 is connected to the ISP 50. The ISP 50 then answers the call and the subscriber's computer 10 and the ISP 50 begin the predefined modem protocol to establish a full data connection.

FIG. 3 illustrates information provided by the subscriber's computer to the switching system 21 for use in determining the lowest cost access to the subscriber's ISP. The information consists of the following elements: a) a dialed number 100—a predefined access phone number that could either be dialed as a 7-digit number or as a 10-digit number depending on the implementation; b) an ISP code 102—a preassigned number representing the desired ISP; and c) a billing number 104—an optional entry that would specify an alternate form of billing (e.g., credit card or telephone calling card).

The exchange of information between the subscriber's computer 10 and switching system 21 may occur in several different ways as follows:

EXAMPLE 1

The subscriber uses a DTMF keypad of telephone 17 at a network interface 16 to dial the dialed number 100 (corresponding to the access telephone number). The subscriber then listens to the menu of available ISPs and responds by entering an ISP code 102, again, using the DTMF keypad of the telephone 17. The subscriber may optionally enter a billing number 104, if desired, again using the DTMF keypad of telephone 17. When the call is completed to the desired ISP and the desired ISP goes off-hook (i.e., answers the call), the subscriber may then enable computer 10 to begin its standard protocol dialog with the desired ISP.

EXAMPLE 2

Rather than using Telephone 17, the subscriber enters the full dial string of data elements 100, 102, and optionally 104 into Computer 10. Each data element 100 may be separated with a pause character, which is supported by most modems 17. The following is an example of the full modem dial string: 950 2181 # 001 # 123456789.

In the above example, 950–2181 is dialed number 100, # is a modem pause character, 001 is an ISP Code 102, and 123456789 is a billing number 104. The pause characters are used so that the processor 34 of the switching system 21 coupled to the subscriber's computer 10 executes instructions to process each data element of the dial string at the appropriate time.

FIG. 4 shows the information that the processor 34 sends to the Network Control Point 40 by query. The information consists of the following elements: a) a subscriber's ANI 200—the 10-digit phone number of the subscriber's telephone line 16; a subscriber's ISP code 202—corresponding with ISP Code 102, which was provided to processor 34 by the subscriber's telephone 17 or computer 10; and c) a billing number 204—this equates to or corresponds with the billing number 104, which was provided to processor 34 by the subscriber.

FIG. 5 shows a layout of an ISP database accessible at a Network Control Point 40. The ISP database includes records for a plurality of ISPs and corresponding network interface locations (NPA-NXX). Specifically, the ISP database has the following components: a) an ISP Code 300—a preassigned ISP number corresponding to the ISP Code 200 used by the processor 34 in the query; b) a location code 302—this is the NPA-NXX identifier of the originating call location; c) a billing code sent 304—this is a flag set to "Y" if the originating party entered alternate billing information or "N" otherwise; d) a routing number 310—this is the resulting routing number given the desired ISP Code 300 and originating location NPA-NXX; and e) an alternate routing number(s) 320—this represents alternate routing number(s) given the desired ISP Code 300 and originating location NPA-NXX. These alternate numbers can be used if the routing number 310 is busy or is out of service.

The Network Control Point 40 uses the information in FIG. 4, received by query, to determine a routing number and an alternate routing number that the subscriber should use to access the desired ISP in the most cost effective manner given his location. Furthermore, if a billing number 204 was sent with the query, the Network Control Point 40 may return a different routing number than if a billing number 204 was not included.

Additional information may be stored in a database at the Network Control Point 40, for example, regarding the desired ISP's per minute service fee to use the ISP's toll-free access telephone number. Also, for example, the network internet control point 40 may store or have access to information regarding network fees charged by the telephone company to route calls from the subscribers location to different available ISP network interfaces. In these scenarios, the Network Control Point 40 calculates the most cost effective access to the desired ISP based upon the information received from the query and stored fee information, and selects routing numbers accordingly.

FIG. 6 shows the information that Network Control Point 40 returns to processor 34. The information consists of: a) a routing number 400 corresponding to the routing number 310 stored or determined in the Network Control Point 40; and b) an alternate routing number 402 corresponding to alternate routing number 320 stored or determined in the Network Control Point 40.

FIG. 7 show the information that the switching system 21 sends to the chosen ISP 50. The information consists of the following elements: a) a subscriber's ANI 450—this is the 10-digit phone number of the subscriber's telephone line 16 (equivalent to Originating Party ANI 200); and b) a billing number 452—this corresponds to the billing number 104, which may have been provided to processor 34 by the subscriber.

Figure 8:
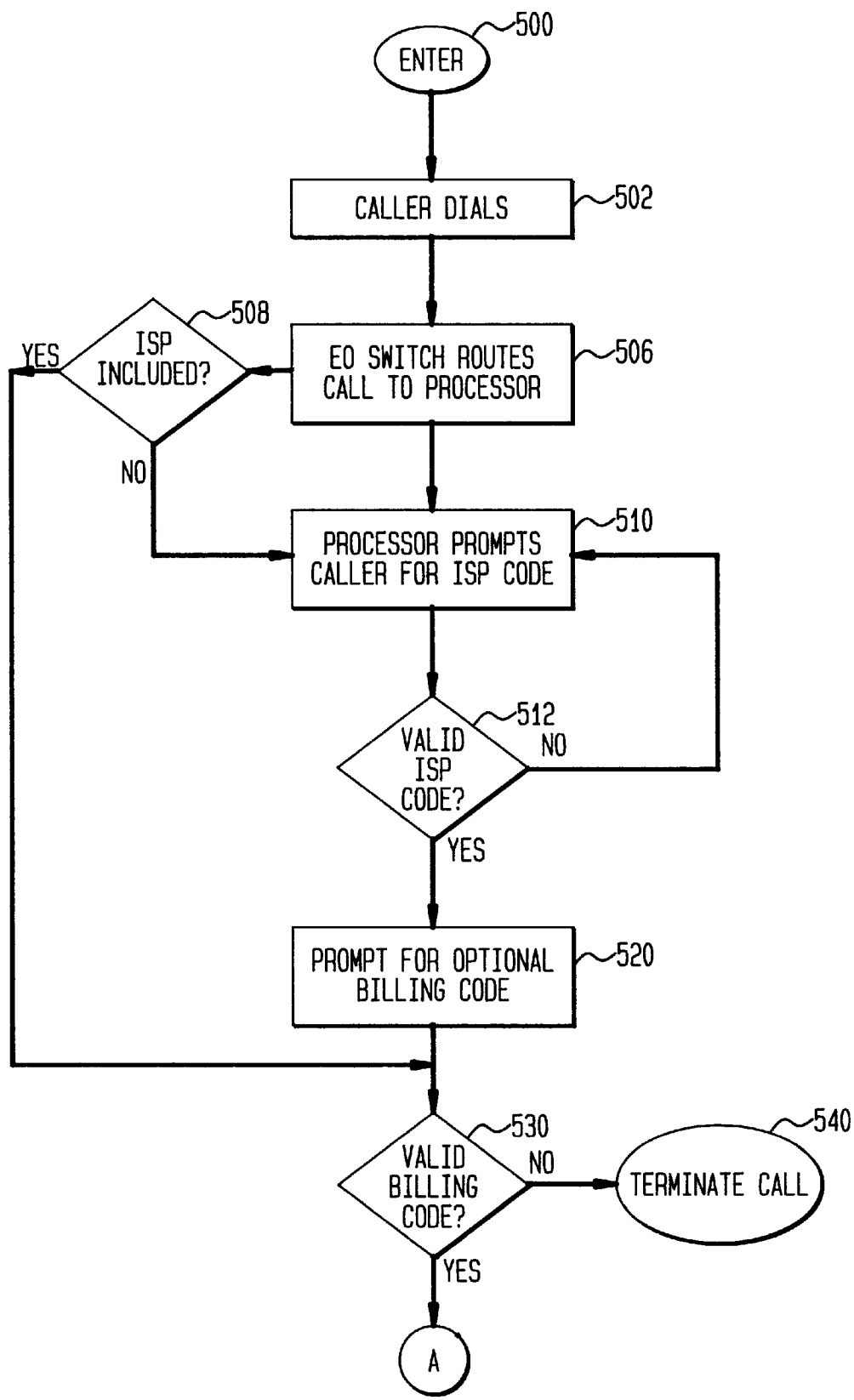
FIGS. 8 and 9 depict a method for routing a call to a particular ISP regardless of the subscriber's location.
Figure 9:
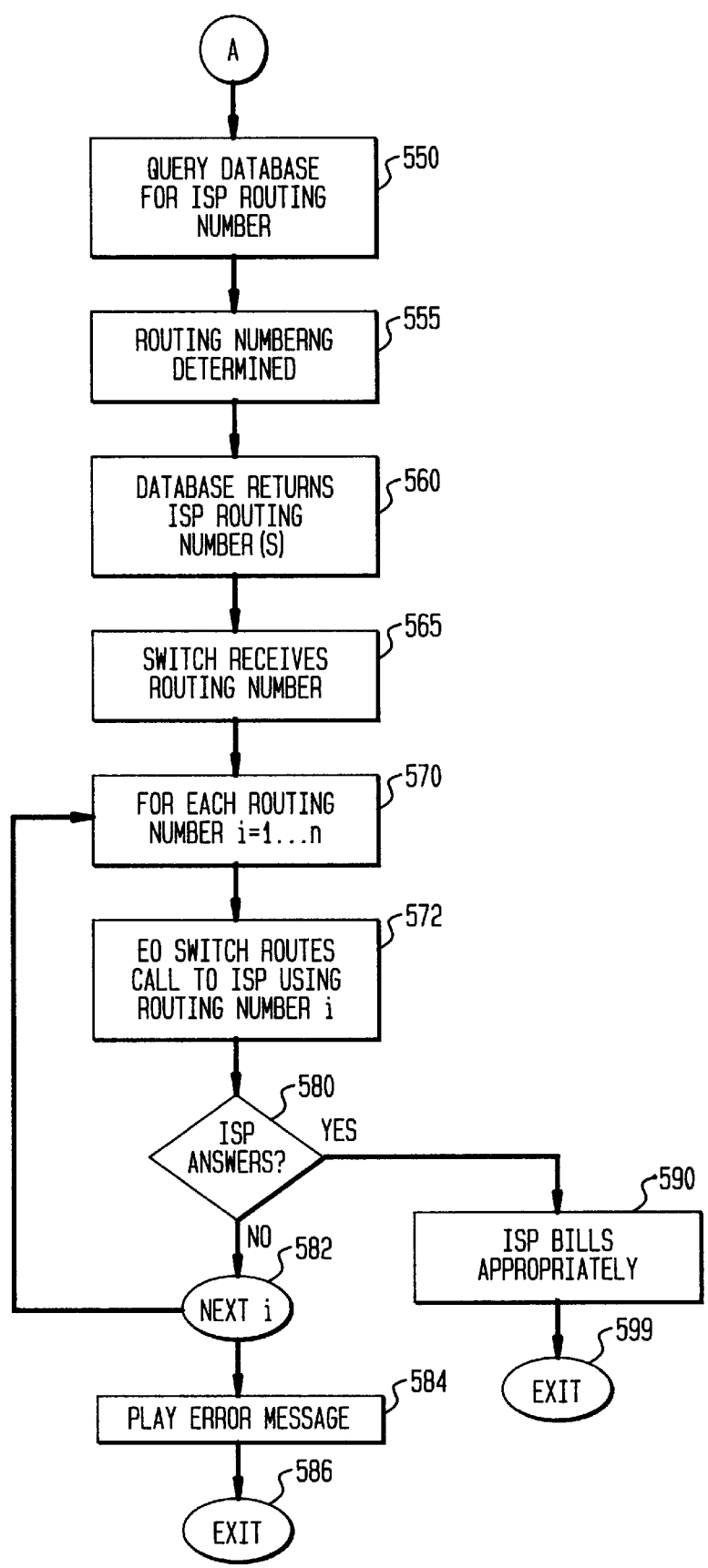

FIGS. 8–9 illustrate a method for connecting a subscriber to a desired ISP that does not require the subscriber's knowledge of the ISP's direct telephone number. Step 500 is the entry point. At step 502, the subscriber dials the widely known access telephone number for accessing data through various ISPs.

In step 506, the receiving switching system determines if the number dialed by the subscriber is the predetermined internet access telephone number, and forwards the call to Processor 34 in that switching system.

Subsequently in step 508, the processor 34 determines if an ISP code is included in addition to the dialed number. If so, step 530 begins, otherwise in step 510, the processor 34 accepts the incoming call and provides an audible selection menu to prompt the originating party for the desired ISP. In response to the prompt, the subscriber enters an ISP code. Step 508 may be performed automatically by the processor 34 initiating a prompt after a certain period of time unless an ISP code is received.

In step 512, the processor 34 accepts the ISP Code 102 entered by the subscriber and checks to see if the ISP Code entered is a valid code. If the code is not valid, step 510 is repeated and the subscriber is prompted again for a valid ISP code. If the entered code is valid, step 520 begins.

In step 520, the processor 34 prompts the subscriber for a billing code 104, which is optional. In step 530, the processor 34 checks to see if there is a billing code. In one embodiment of this step, a timer is set so that if the subscriber does not respond within a reasonable time period, for example 5 seconds, it will be assumed that the subscriber elected not to enter a billing code. If the subscriber enters a billing code, it will be validated against valid billing codes. If no billing code is entered or if the billing code is valid, step 550 begins. If the billing code is invalid, the call terminates in step 540.

At step 550, the processor 34 will query Network Control Point 40, based on the information received from the subscriber to obtain the appropriate routing number(s) to the ISP desired by the subscriber. The information includes the subscriber's ANI 200, the ISP code 202, and the billing number 204

In step 555, the Network Control Point 40 responds to the query by accepting the information passed by processor 34 and accesses the ISP database as described immediately below to determine the routing number of the lowest cost point to access the provider corresponding to the ISP code provided. Most of the time this will be a local access telephone number when available. During the database access, the Network Control Point 40 looks for a record that has: 1) a match between the provided ISP Code 202 and ISP Code 300; 2) a match between the provided NPA-NXX digits of the originating party's ANI 200 and Location NPA-NXX 302; and 3) a match between the billing number 204 provided by the subscriber and the billing code sent 304 being a "Y" (for yes).

If a record (or row) is found with these three matches, a resulting routing number 310 and alternate routing number (s) 320 is returned to the processor 34 in step 560.

In one embodiment of the invention, data representing the billing code sent 304 includes a wild-card character denoted by a "*". This wild-card character signifies that the result of the record match is determined entirely by meeting criteria 1 and 2 above.

To illustrate the database access function, the following illustrative examples use the sample data in FIG. 5 to determine the resulting routing numbers:

EXAMPLE 3

Processor 34 launches a query with the following information: subscriber's ANI 200="908 123–1450," ISP Code 202="0001," and a billing number 204=68548233845728495." In response, the Network Control Point 40 returns the following:

routing number 400=908 666–0001 alternate routing number(s)=908 666–7001

EXAMPLE 4

Processor 34 launches a query with the following information: subscriber's ANI 200="908 123–1450," ISP Code 202="0001," and no billing number 204. In response, the network internet control point 40 returns the following:

Routing Number 400=908 666–0000

Alternate Routing Numbers(s)=908 666–7000

EXAMPLE 5

Processor 34 launches a query with the following information: ANI 200="712 455–9867," ISP Code 202="5000." In response, the Network Control Point 40 returns the following:

routing number 400=712 433–4806 alternate routing number(s)=712 439–0000

This is returned regardless of whether a billing number 204 was entered or not. The logic for performing steps 550–560 as described above may be stored on a computer usable medium, for example a hard-disk drive, a floppy-disk drive, a random access memory device, or a read only memory device.

In step 565, processor 34 accepts the routing number information provided by the Network Control Point 40 and provides this information to the switching fabric 30 of the switching system that originated the call, switching system 21.

In step 570, a loop is entered where switching system 21 attempts to reach the desired ISP using the routing numbers provided by Network Control Point 40. The loop will be repeated for a maximum of "n" times where "n" is number of routing numbers (i.e., Routing Number 400 plus each of the alternate Routing Number(s) 402) provided by Network Control Point 40.

In step 572, switching system 21 uses routing number "I" to attempt to reach the desired ISP. Then in step 580, switching system 21 checks to see if the ISP answers the call attempt. If the ISP does not answer (e.g., it may be busy or out-of-service), then in step 582 "I" is incremented so that the loop can be repeated and the next routing number can be attempted by the switching system 21. If incrementing "I" results in a value that exceeds"n" (the number of routing numbers), then all routing numbers were not reachable and step 584 plays an error message. The error message could say "Sorry, your ISP could not be reached. Please try your call again later."

If, during step 580, the ISP answers, then in step 588 a data connection is established between the ISP and the modem 15 of the computer 10. Subsequently, the modem 15 and the ISP perform normal "protocol handshaking" so that the full data connection is established. At step 590, the ISP records the billing method for the call as appropriate.

Although specific embodiments of the invention have been disclosed, it will be understood by those having ordinary skill in the art that changes can be made to those specific embodiments without departing from the spirit and the scope of the invention.

What is claimed is:

1. A system for routing a call requesting access to a service provider based on the location of the caller, comprising:

at least one switching system having network interfaces within a telecommunications network for receiving a call having a prespecified dialed number and service provider code and for launching a query, in response to the call, that includes the service provider code and a number identifying the network interface through which the call was received; and a database within the telecommunications network including at least one routing number associated with each of a plurality of service providers, wherein the database determines a routing number, in response to the query, for least cost access to a service provider corresponding to the service provider code, and returns the routing number to the switching system.

2. The system according to claim 1, wherein the switching system routes the call to the service provider based on the routing number.

3. The system according to claim 1, wherein a computer is coupled to one the network interfaces, the switching system prompts a user at the computer to select a service provider from a list, and the computer returns a selection to the switching system as the service provider code.

4. The system according to claim 3, wherein the switching system receives the list from the database.

5. The system according to claim 1, wherein a computer is coupled to the switching system and is configured to include the service provider code and the prespecified dialed number.

6. A method for routing a call requesting access to a service provider based on the location of the caller, comprising the steps of:

receiving a query from a caller through a telecommunications network, the query including a service provider code and a number associated with a network interface through which the call originated;

accessing a database including at least one service provider, each service provider having at least one corresponding routing number;

determining a routing number to access a service provider corresponding to the service provider code in a least cost manner, based on the network interface originating the call; and returning the routing number to the telephone network in response to the query.

7. The method according to claim 6, wherein the determining step selects a local access telephone number as the routing number.

8. The method according to claim 6, wherein the determining step includes calculating the lowest cost routing number for accessing a service provider, based on a service fee charged by the service provider and a network fee charged for using the telecommunications network.

9. The method according to claim 6, wherein the telecommunications network connects the call based on the routing number.

10. The method according to claim 6, further comprising the steps of:

determining in response to the query an alternate routing number to access a service provider corresponding to the service provider code; and returning the alternate routing number to the telecommunications network.

11. The method according to claim 10, wherein the telecommunications network connects the call to the alternate routing number if the routing number is not accessible.

12. The method according to claim 6, wherein the method is performed by a server coupled to the telecommunications network.

13. The method according to claim 12, wherein the server is a network control point.

14. The method according to claim 12, wherein the server is a service control point.

15. A computer program product, comprising:

a computer useable medium having computer program logic stored therein, wherein the computer program logic comprises:

receiving means for enabling a computer to receive a query from a telecommunications network including a service provider code and a location of a network interface of a call;

accessing means for enabling the computer to access a service provider database including at least one routing number corresponding to each service provider in the database;

determining means for enabling the computer to determine a routing number for least cost access to a service provider corresponding to the service provider code; and returning means for enabling the computer to return the routing number to the telecommunications network in response to the query.

16. The computer program product according to claim 15, wherein the determining means determines a local access telephone number as the routing number.

17. The computer program product according to claim 15, wherein the determining means includes means for determining the routing number for least cost access to the service provider, based on a service fee charged by the service provider and a network fee charged for use the telecommunications network.

* * * * *